United States Patent [19]

Sambhu

[11] Patent Number: 5,162,987
[45] Date of Patent: Nov. 10, 1992

[54] CONTROLLER WHICH USES PULSE WIDTH AND PULSE FREQUENCY MODULATED SIGNALS TO CONTROL A VARIABLE

[75] Inventor: Mahesh K. Sambhu, Tampa, Fla.
[73] Assignee: Leslie Controls, Inc., Fla.
[21] Appl. No.: 635,366
[22] Filed: Dec. 28, 1990
[51] Int. Cl.$^5$ ............................................. G05B 13/02
[52] U.S. Cl. .................................. 364/162; 318/599; 318/606
[58] Field of Search .................... 364/148, 160–163; 318/599, 606, 607, 609, 610

[56] References Cited

U.S. PATENT DOCUMENTS

| | | | |
|---|---|---|---|
| 3,721,811 | 3/1973 | Taylor et al. | 318/606 |
| 3,742,326 | 6/1973 | Okuda et al. | 318/606 |
| 3,836,756 | 9/1974 | Yammoto et al. | 318/606 |
| 4,623,827 | 11/1986 | Ito | 318/599 |
| 4,749,927 | 6/1988 | Rodal et al. | 318/599 |
| 4,763,052 | 8/1988 | Lundin et al. | 318/599 |
| 5,070,292 | 12/1991 | Goff | 318/599 |

Primary Examiner—Jerry Smith
Assistant Examiner—Jim Trammell
Attorney, Agent, or Firm—David M. Ostfeld

[57] ABSTRACT

A controller is disclosed which uses pulse width ("PWM") and pulse frequency ("PFM") modulated signals to control a variable to a desired value, the PWM and PFM signals generated through calculation of the difference between the variable and the desired value and then by routing either the PWM or the PFM to the final control element or elements, thereby performing the functions of a proportional and integral controller. Derivative action is also disclosed by differentiating the difference, after filtering, and using the relationship between the difference and the differential to determine the routing of the output signal to the final control element or elements.

25 Claims, 3 Drawing Sheets

CONTROLLER WHICH USES PULSE WIDTH AND PULSE FREQUENCY MODULATED SIGNALS TO CONTROL A VARIABLE

FIELD OF THE INVENTION

The invention relates to electronic controllers and regulators and more particularly to electronic controllers and regulators having a final control element which is pneumatically powered.

BACKGROUND OF INVENTION

Electronic and pneumatic controllers are commonly used for controlling physical states of process variables, such as pressure, temperature, level and other variables for process and industrial operations. The simplest type of control system uses an on/off controller, commonly known as bang-bang control. For example, see U.S. Pat. No. 3,778,205, issued Dec. 11, 1973 to Lane, et al, entitled Modified On-Off Control.

For processes having one or more process variables which respond quickly to changes in the final control element, better results can be obtained by a controller with proportional action, the output of which changes in proportion to a change in the state of the process variable. The gain setting on a proportional controller provides a means for adjusting the ratio of controller output change to change in the state of the process variable, so that the control action can be tuned to the process control loop. Low gain makes a controller react slowly to cause the state of the process variable to return to set point when the state of the process variable moves away from the set point, while a high gain setting causes the controller to act more like an on/off controller discussed above. A potential deficiency of the proportional controller is that it generates steady state offsets of the state of the process variable with respect to the set point for load changes. To compensate for this potential deficiency, integral action may be added to proportional action to overcome offset. The integral portion of the controller compensates for average error over a period of time. If the error exists, it will continue to add to the action of the proportional portion of the controller output to correct the error or offset (this action is also called reset action). Therefore, an adjustment is needed to change the frequency with which the integral portion of the controller resets (repeats per minute) the proportional portion. Integral action is usually used in conjunction with proportional action, and the two together are referred to as a "PI controller".

While a PI controller can help eliminate an offset, it can cause larger correction overshoots than proportional control. Another type of control action, called derivative action, may be necessary to overcome or minimize this potential deficiency. Derivative action provides a controller output proportional to the rate of change of the error signal between the set point and the state of the process variable. The adjustment for derivative action ("rate"), if set too low, will cause slow response to load changes and, if set too high, will cause control system instability. The rate is therefore usually adjusted for each control system so that the system responds correctly to changes in load. The resulting instrument is known as a "PID controller", or a three mode controller.

The tuning of this controller requires skill, and it takes considerable time and effort to achieve a stable system.

For general reference to controllers with regard to final control elements, see U.S. Pat. No. 2,231,568, issued Feb. 11, 1941 to H.H. Gorrie, entitled Control System; U.S. Pat. No. 2,917,066, issued Dec. 15, 1959 to G. Bergson, entitled Fluid Flow Control System; U.S. Pat. No. 3,196,900, issued Jul. 27, 1965 to A.R. Catheron, et al, entitled Electronic Control Apparatus; U.S. Pat. No. 3,307,824, issued Mar. 7, 1967 to G. Weisheit, entitled Control System for Flowing Media; U.S. Pat. No. 4,146,051, issued Mar. 27, 1979 to Brian E. Sparkes, entitled Fluid Flow Control System; U.S. Pat. No. 4,431,020, issued Feb. 14, 1984 to Kowalski, entitled Flow-Control System Having a Wide Range of Flow-Rate Control.

When a controller is used in conjunction with a diaphragm control valve, another device called a positioner is normally used between controller and the valve for precise control of a process variable.

For various types of control valves, see U.S. Pat. No. Re. 32,644, reissued Apr. 12, 1988 by Brundage, et al, entitled Solenoid Control Flow Valve; U.S. Pat. No. 2,398,452, issued Apr. 16, 1946 to Shaw, entitled 3-Way Solenoid Valve; U.S. Pat. No. 2,616,449, issued Nov. 4, 1952 to Maha, entitled Pilot Operated Solenoid Control Valve; U.S. Pat. No. 3,135,493, issued Jun. 2, 1964 to Gizeski, entitled Electro-Pneumatic Valve Operator; U.S. Pat. No. 3,211,415, issued Oct. 12, 1965 to Rudelick, entitled pilot Control Valve Actuating Mechanism; U.S. Pat. No. 4,058,287, issued Nov. 15, 1977 to Fromfield, entitled Pilot-Operated Valve Having Constant Closing Rate; U.S. Pat. No. 4,553,732, issued Nov. 19, 1985 to Brundage, et al, entitled Solenoid Control Flow Valve; U.S. Pat. No. 4,605,197, issued Aug. 12, 1986 to Casey, et al, entitled Proportional and Latching Pressure Control Device; U.S. Pat. No. 4,699,351, issued Oct. 13, 1987 to Wells, entitled Pressure Responsive Pilot Actuated Modulating Valve; U.S. Pat. No. 3,926,405, issued Dec. 16, 1975 to Arnold, entitled Solenoid Operated Proportional Valve; U.S. Pat. No. 4,014,509, issued Mar. 29, 1977 to Yoshino, et al, entitled Proportional Electro Magnetic-Type Direction and Throttle-Controlling Valve; U.S. Pat. No. 4,049,232, issued Sep. 20, 1977 to Byers, entitled Pressure Compensating Fluid Control Valve; U.S. Pat. No. 4,193,421, issued Mar. 18, 1982 to Sakakibara, et al, entitled Electromagnetically Operated Valve Unit; U.S. Pat. No. 4,411,406, issued Oct. 25, 1983 to Inada, et al, entitled Electro Magnetic Flow Control Valve Assembly; U.S. Pat. No. 4,585,206, issued Apr. 29, 1986 to Itoh, entitled Proportional Flow Control Valve; U.S. Pat. No. 4,605,197, issued Aug. 12, 1986 to Casey, et al, entitled Proportional and Latching Pressure Control Valve; U.S. Pat. No. 4,729,397, issued Mar. 8, 1988 to Bruss, entitled Electro Magnetic Control Valve for a Pressure Fluid and Associated Method.

Although it has been known in the art to control pneumatic operated valves with pneumatic controllers and to use interfaces with pneumatic valves, including solenoid valves, to drive a pneumatic valve by an electronic controller, and it has also been known to use electronic transmitters and transducers to supply the state of process variables to electronic controllers, the conversion from electronic to pneumatic signals is expensive. There is, accordingly, a need for an electronic controller sensing electronic signals representative of the state of process variables and directly these signals as output modifications from a proportional action and directly interfacing to pneumatic control valves, such as diaphragm control valves, without an intermediary positioner.

SUMMARY OF THE INVENTION

The present invention discloses an electronic controller and method which effectively senses electronic signals representative of the state of process variables and acts as a PID controller through adjustments to the output of proportional action at the output stage. Further, the output of this controller acts through two solenoid valves to adjust the position of a control valve that is pneumatically powered. The controller includes a translation of the analog error signal into a pulse width modulated or pulse frequency modulated controller output to drive the solenoid valves that control the pressure acting on a pneumatic control valve or other control device.

BRIEF DESCRIPTION OF THE DRAWINGS

For a further understanding of the nature and the objects of the present invention, reference is made to the following drawings in which like parts are given like reference numerals and wherein.

DESCRIPTION OF THE PREFERRED EMBODIMENT

Figure 1:
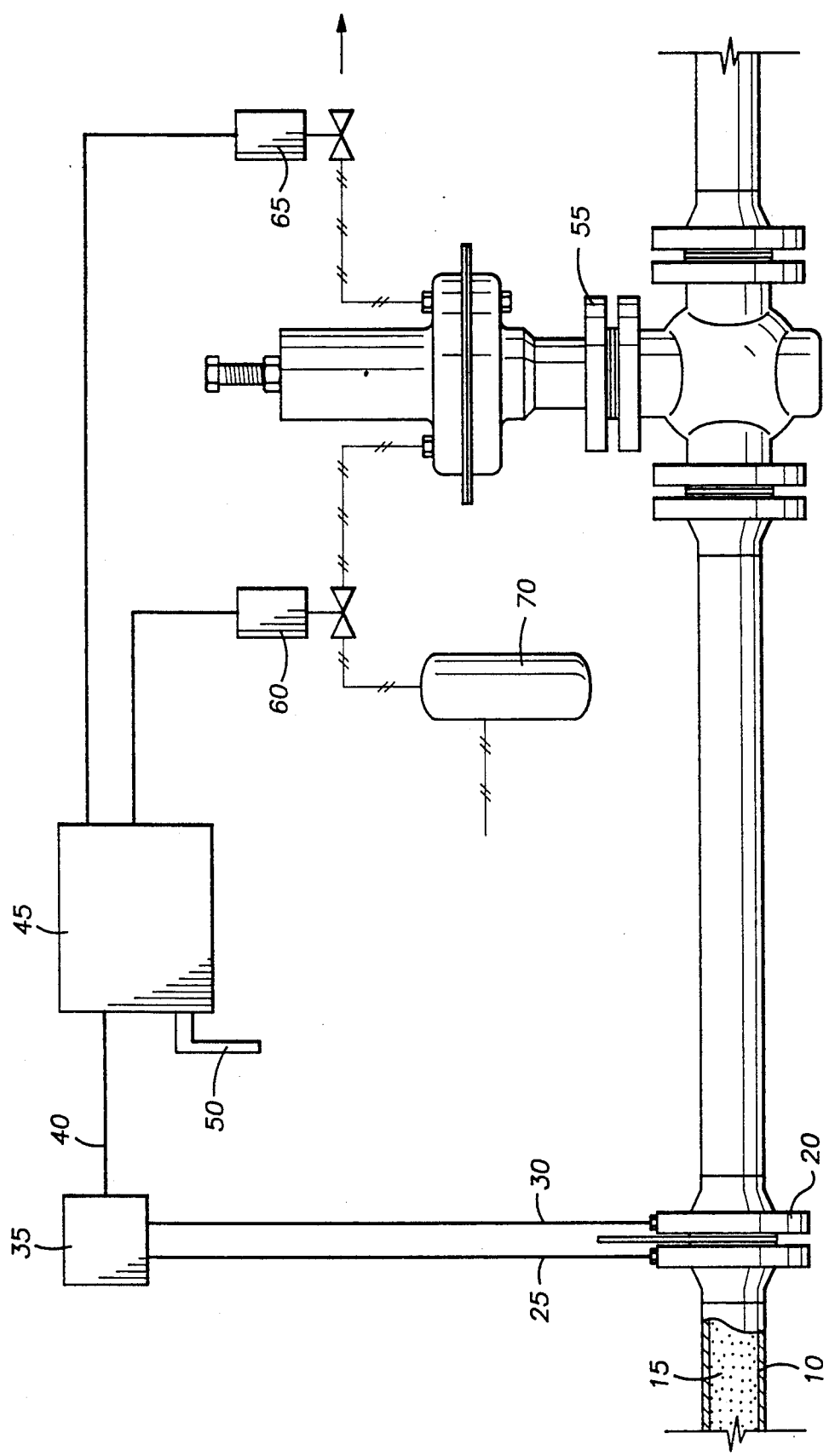
FIG. 1 illustrates a flow control loop using an electronic measurement device and a pneumatic control valve with an electronic controller of the preferred embodiment of the present invention.

FIG. 1 depicts a simple flow control loop comprising a flow line 10 having fluid 15 flowing therein. An orifice meter 20 is inserted in line 10 to measure the flow rate of fluid 15. The state of upstream and downstream pressure of the orifice meter 20 is measured through lines 25, 30, respectively, which connect with a differential pressure transmitter 35. Transmitter 35 is connected as the process feedback 40 to controller 45. Controller 45 also has a set point 50 which can be entered into the controller 45 by hand manipulation or by remote actuation. The output of controller 45 controls valve 55 by a set of solenoid valves 60, 65. Solenoid valve 60 controls flow of compressed air or other gas from source 70 associated with the pneumatic drive of valve 55. Valve 65 controls the venting of compressed air or other gas in valve 55. It should be understood that this is a simplified control loop and any control loop could be used for any process variable and control element. This would include remote setting of another controller by controller 45 as a control element and could be any industrial variable and should not be taken to even be limited to pressure, temperatures, levels, flows and the like. Further, the set point 50 may be locally entered at controller 45 or might be remotely set by another controller not shown. Also, normally and preferably, solenoid valves 60, 65 are packaged within controller 45. In addition, normally and preferably, the adjusting screw and cap of valve 55 are not used.

Figure 2:
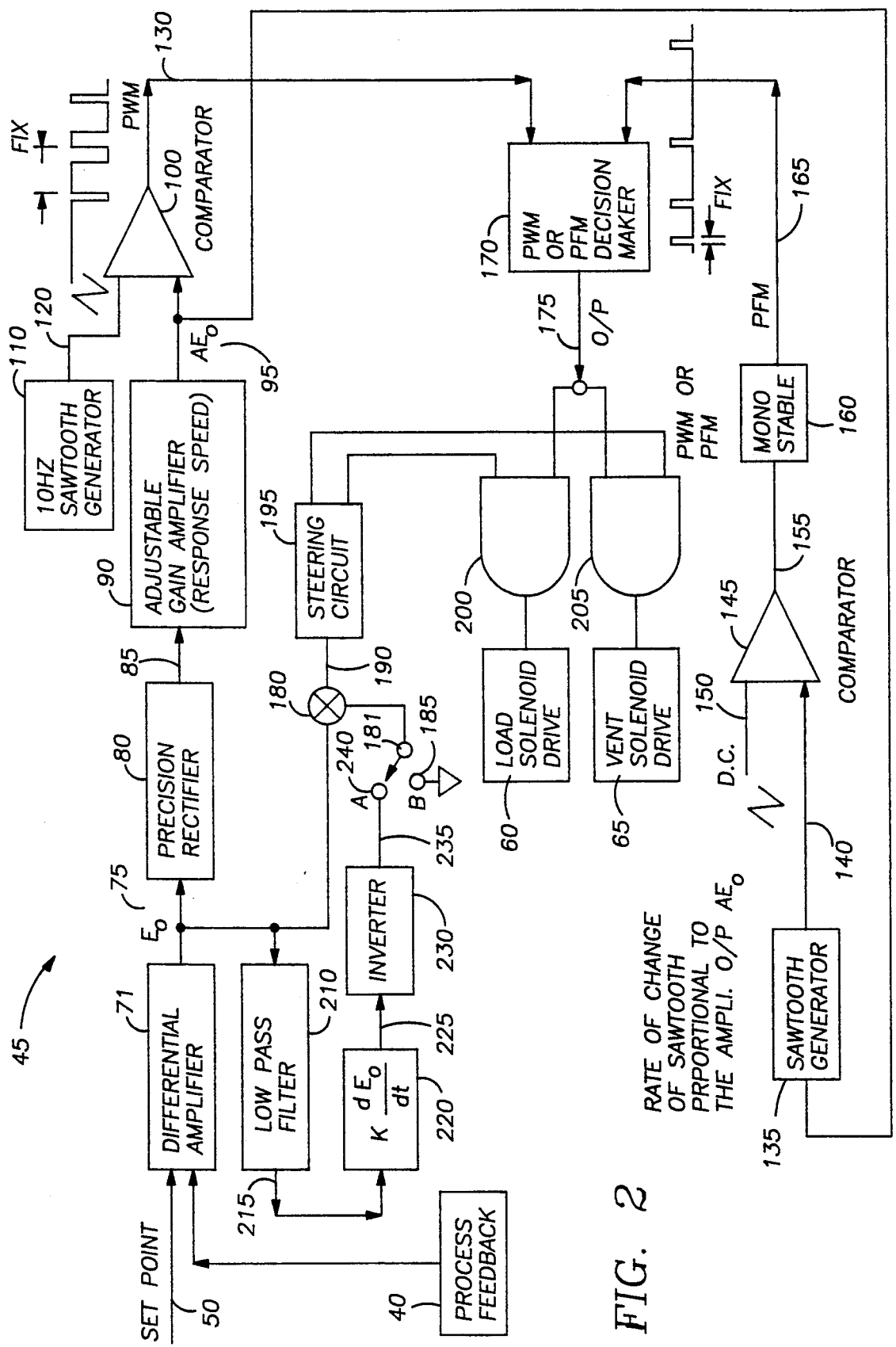
FIG. 2 illustrates a functional block diagram of the electronic controller of the preferred embodiment of the present invention.

FIG. 2 depicts the basic functional blocks of controller 45. The set point signal 50 and process feedback 40 are feed to a differential amplifier 71, such as an instrumentation amplifier, to generate an error signal 75 designated as $E_0$. The error signal 75 is the difference between the set point 50 and the process feedback 40. The differential amplifier 71 may have a gain other than one, such as for example two. In such a case, differential amplifier 71 generates error signal 75, which is the difference between the set point 50 and the process feedback 40, multiplied by the gain of the amplifier 71. Also, there may be an invertor to invert the signal. The final error signal 75 then may be an inverted signal.

The error signal 75 is feed to a precision rectifier 80. As shown in FIG. 2, error signal 75 is not inverted, which would be the case for a direct acting control system. However, an inverting amplifier (not shown) can be interspersed between the differential amplifier 71 and the precision amplifier 80 to invert signal 75 to permit the controller to be a reverse acting controller. A switch (not shown) may also be used to permit selection of the use of the control as a direct or reverse acting controller.

Typically, a circuit for precision rectifier 80 would be constructed using two serial connected operational amplifiers (not shown). The offset of the output of the first operational amplifier may be trimmed by a potentiometer (not shown). In addition, an adjustable voltage, typically called a "dead band" voltage, may be added to the input of the second stage operational amplifier by a second potentiometer (not shown). This second potentiometer permits adding an adjustable dead band to the controller 45, effectively maintaining the output 85 of precision rectifier 80 at zero when the error input 75 to the precision rectifier 80, after adjustment for offset discussed above, falls within the selected dead band. Thus, when the error signal 75 falls within the selected dead band, the controller 45 would maintain its level of output.

The rectified error signal, which is the output 85 of precision rectifier 80, is then fed to an adjustable gain amplifier 90. The adjustable gain ampler 90 is typically constructed by using a variable resistor (not shown) to set the gain of controller 45. Typically the variable resistor would be in the feedback circuit (not shown) of an operational amplifier making up the adjustable gain amplifier 90. In the preferred embodiment, the variation of gain is approximately 10:1. Presuming that the gain of the amplifier is "A" and the gain of the differential amplifier 71 is one, then the output of the amplifier 90 is $AE_0$ for an error signal $E_0$ and is shown in FIG. 2 with identifier 95. The gain A can be smaller than 1 or larger than 1. Typically in the controller 45, the gain adjustment A would be through the above-referenced potentiometer which would be labeled as "response speed" to an operator. As with all illustrations of electronic circuitry, the illustration of using an operational amplifier with a variable resistor in the feedback circuit is just one illustration of the way the gain portion of the circuit could be accomplished by those skilled in the electronics arts.

The output 95 of adjustable gain amplifier 90 is fed to one side of a comparator 100. The other input of comparator 100 is the output of a ten Hertz sawtooth generator 110. Sawtooth generator 110 is a fixed frequency sawtooth generator. Although the preferred embodiment uses ten Hertz as its frequency, this frequency is not critical to the operation of the controller 45. While many different mechanisms may be used to produce a sawtooth wave form, an integrated circuit (not shown) to produce ten Hertz pulses may be fed to an operational amplifier (not shown) having a capacitor feedback in parallel with a field effect transestor (not shown). The ten Hertz pulse may turn on the field effect transistor, thus discharging the capacitor (all of which are not shown) at a rate of ten Hertz. Accordingly, when the field effect transistor is off, a ramp would be generated at the output of the operational amplifier as a capacitor charges.

Figure 3:
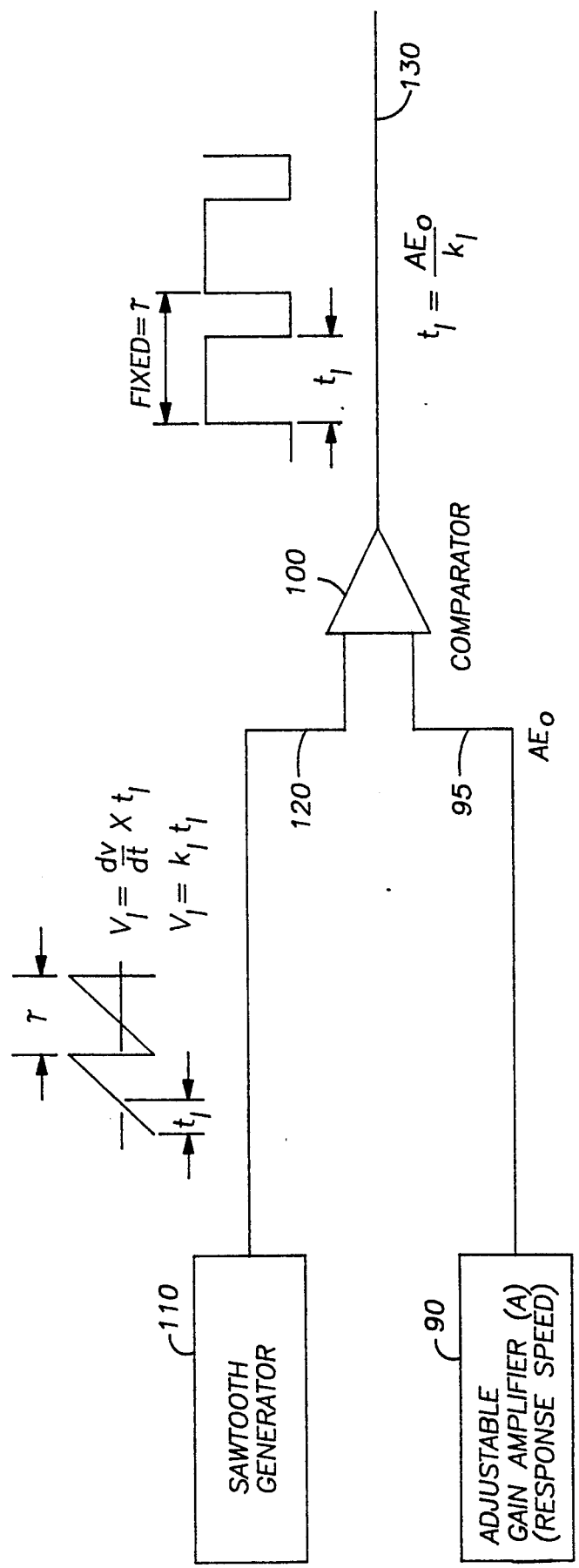
FIG. 3 is a detailed block diagram of the sawtooth generator, adjustable gain amplifier and comparator of FIG. 2.

With one input of comparator 100 being the output 120 of the sawtooth generator 110 and the other input being the output 95, i.e. $AE_0$, of adjustable gain amplifier 90, comparator 100 will have an output 130 which is a pulse width modulated, the pulse width being directly proportional to the error signal 95. This is because the output 120 of the sawtooth generator 110 is compared with the output 95 of the adjustable gain amplifier by the comparator 100. The comparator 100 is a very high gain amplifier which changes its output when the two inputs are almost equal. Therefore, the equation to be used to determine the pulse width of the output is: $AE_0 = V_1 = k_1 t_1$. See FIG. 3. In this equation, $k_1$ is the change of voltage with respect to time of the sawtooth generator; i.e. the slope of the curve of the sawtooth, and $t_1$ represents the elapsed time during the sawtooth. Accordingly, when the comparator 100 is turned on so that there is a level signal from its output 130, the voltage output 95 of adjustable gain amplifier 90 must be equal to the voltage output 120 at the time of equality with the output of sawtooth generator 110 as expressed by the above equation. The time in which this occurs would be:

$$t_1 = \frac{A E_0}{k_1}. \quad (1)$$

Equation (1) shows that the time $t_1$ is directly proportional to amplifier 90 gain "A" and error signal $E_0$, where $k_1$ as discussed above is a constant fixed by the sawtooth generator. Accordingly, equation (1) shows that by fixing the gain of the amplifier by adjusting the response speed potentiometer (not shown) of gain amplifier 90, the pulse width $t_1$ is directly proportional to the error signal $E_0$. The output signal 130 of comparator 100 is thus pulse width modulated ("PWM") based on error signal $E_0$.

Output 95 is also the voltage input to sawtooth generator 135. Because amplified error signal 95 is an input to sawtooth generator 135, the output voltage 140, which is a sawtooth wave form, has a value $v_2$ at any time $t_2$ which follows the equation: $v_2 = A E_0 t_2 \div k_2$, where $k_2$ is a constant equal to the inverse of change in voltage over time, which is the slope of the sawtooth generator. The output 140 of sawtooth generator 135 is fed to a comparator 145. The other input of comparator 145 is a DC voltage 150. As discussed above, the comparator 145 is also a very high gain amplifier which changes its output when the two inputs are almost equal. Therefore, the output 155 of comparator 145 would occur when the inputs 140, 150 to comparator 145 follow the equation: $V_2 = A E_0 t_2 \div k_2 = v_{dc}$, where $v_{dc}$ is the reference voltage 150 to the comparator 145. Thus, the time in which this occurs is given by the equation:

$$t_2 = \frac{v_{dc} k_2}{A E_0}. \quad (2)$$

As is seen from equation (2), the interval of the signal will be longer with decreases in the error signal, $E_0$.

The output 155 of comparator 145 is fed to a monostable 160 which sets the length of its pulses but the frequency of which will be set by comparator 145 through its output 155. Thus, the output 165 of monostable 160 will be pulses of fixed width, but variable frequency depending of the error signal $E_0$, with the frequency decreasing as the error signal $E_0$ becomes smaller. It is preferable in the preferred embodiment that the pulse width is 15 milliseconds for the pulse frequency modulated signal ("PFM").

Signals 130 and 165 are fed to a decision maker 170. The purpose of decision maker 170 is to determine to send either the PWM or the PFM signal to its output 175. The decision is made based on the length $t_1$ of the pulse width of signal 130. When the time $t_1$ falls below a predetermined duration, such as 15 milliseconds, decision maker 170 would permit the PFM signal 165 to be its output and block the PWM signal 130. When $t_1$ is above the predetermine duration or at the predetermined duration, such as, for example, 15 milliseconds, decision maker 170 will permit the PWM signal 130 to be output 175 and will block the PFM signal 165.

The necessity for having a PFM signal instead of always using a PWM signal is evidenced by equation (1). Ultimately, the duration of the PWM signal 130 would be the duration of the output signal to the solenoids 60, 65. As can be seen from equation (1), the pulse width is proportional to the error signal, $E_0$. As the error signal, $E_0$, approaches zero, the pulse width of the PWM signal 130 becomes so small that solenoids 60, 65 would not be properly turned on, for example, with pulse durations typically less than 10 milliseconds. This would mean that the controller 45 could never reduce the error signal $E_0$ to zero. To overcome this difficulty, it is necessary to turn the solenoids on until the error is actually zero. To energize at a minimum value while the error signal $E_0$ is still greater than zero, the widths of the PFM was chosen at approximately 15 milliseconds so that the solenoids 60, 65 are energized with fixed pulse width but not so often (based on frequency) to achieve an unstable system. This is the reason the change is made in the mode of the operation from PWM to PFM (with a fixed but small pulse duration and with frequency decreasing as the error signal, $E_0$, reaches zero). This is the integral action of controller 45 and in the preferred embodiment is not adjustable. It automatically eliminates reset wind-up.

A feature of differential amplifier 71 is that it is bidirectional. This means that when the process feedback 40 is above the set point 50, the error signal $E_0$ 75 is positive, and when the set point 50 is below the process feedback 40 the error signal $E_0$ 75 would be negative. This error signal 75 also feeds a summer 180. (For a reverse acting controller, the inverted error signal 75 would be fed to summer 180.) The other input to summer 180 may be ground 185 if the derivative portion of the controller is not needed, indicated by the position of switch 181. In such a circumstance, the output of 195 of summer 180 would be the error signal fed directly to steering circuit 195.

Steering circuit 195 determines whether output 175 is fed to solenoid 60 or solenoid 65. This is done by AND gates 200, 205. The polarity of error signal 75 determines whether AND gate 200 or AND gate 205 is activated to route the pulse signals 175 to either solenoid 60 or solenoid 65. For a positive error $E_0$ 75, gate 200 would be activated (presuming a direct acting controller) and for a negative signal of error $E_0$ 75, AND gate 205 would be activated (presuming a direct acting controller). Thus, for example, if the flow rate of fluid 15 is line 10 were below set point 50, AND gate 200 would cause solenoid drive 60 to be actuated, which would permit air, for example, to be introduced from source 70 to valve 55, causing valve 55 to further open and increase the flow of fluid 15. Alternatively, if the fluid flow rate 40 was above the set point 50, then solenoid drive 65 would be activated through AND gate 205, causing air, for example, to bleed from the valve 55, which would cause it to close, shutting down the flow of fluid 15 to some extent.

Thus, for a PI controller, the circuitry would operate by comparing the set point 50 to the process feedback, to produce an error signal 75 which would be rectified and have a gain 95 applied to achieve proportional operation, which would be gated appropriately to solenoid drive 60, 65 to drive valve 55 to compensate for deviation from set point 50. In addition, integration would occur through the use of decision maker 170 to continue to output to the solenoid drives 60, 65, either by signal 165 or signal 130 until the error has gone to zero, final adjustments probably being made through PFM to decision maker 170. Thus, controller 45 would be responsive when installed on fast systems, such as pressure or flow control. However, if installed on a slower system, such as temperature or level control, controller 45 may not operate satisfactorily because of the lag in the system. Accordingly, derivative action may also be included as part of controller 45.

As shown in FIG. 2, error signal 75 may be introduced into a low pass filter 210. Low pass filter 210 allows only low frequencies to go through to its output 215, while high frequency and noise are filtered out. This prevents differentiation in differentiator 220 of high frequencies or noise, which because of their high rate of change, would upon differentiation mask all differentiation of low frequencies. Differentiator 220 performs a taking of the first derivative of error signal 75 with respect to time and multiplying such differentiation by a constant K, which is the derivative rate constant. In the preferred embodiment of the present invention, K is not adjustable. The resulting signal 225 is then fed to an invertor 230 which inverts the signal; i.e. producing a signal 235 equal to $$\frac{-KdE_0}{dt}.$$

If switch 181 is set for the derivative position 240 for summer 180, steering circuit 195 would be effected by an input signal 190, equal to the difference between $E_0$ and $$\frac{KdE_0}{dt}.$$

Thus, steering circuit 195 would change when the load and vent solenoids 60, 65, respectively, are activated by controller 45, based not on when the error signal $E_0$ 75 change polarity, but when $$E_0 = \frac{KdE_0}{dt}.$$

Thus, this derivative control allows the controller 45 to take early action looking at the rate of change of the error signal $E_0$, while permitting correction to be applied as a function of the error signal $E_0$ 75. This is a different control strategy from the conventional PID controller which would have the output as a function of the sum of the error signal $E_0$ 75 and its integral and its derivative.

While the above describes the preferred embodiment of the present invention, many variations are possible. For example, a display console may be included on the face of the panel to, for example, display calibration of the low range limit and high range limit of the transmitter values, the set point, the process variable, and the error signal. In addition, there may be potentiometers available to set the set point, response speed or dead band. In addition, the display unit may be a liquid crystal display or other suitable display. Further, the unit may have its own power supply using external supply voltage of 120 V at 50 or 60 Hertz, or 240 V at 50 or 60 Hertz, which would be switch selectable. Further, it could accept standard 4 to 20 milliamp signals or RTD temperature inputs. Further, the remote set point adjustment may be a 4 to 20 milliamp standard input. It may also have multiple enclosures, such as NEMA 1, 2, 3, 35, 4, 4×, 12 and 13.

Because many varying and differing embodiments may be made within the scope of the inventive concept herein taught, including equivalent structures and materials hereinafter thought of, and because many modifications may be made in the embodiments herein detailed in accordance with the descriptive requirements of the law, it is to be understood that the details herein are to be interpreted as illustrative and not in a limiting sense.

What is claimed as invention is:

1. A controller for use to control the state of a physical variable, by manipulating an output connected to the controller, comprising:
   a first input representing the desired value of the physical variable;
   a second input representing the current value of the physical variable;
   first means for calculating the difference between said first and second inputs,
   second means for generating a pulse width modulated signal, the width of each of said pulses of said pulse width modulated signal being proportional to said difference;
   third means for generating a pulse frequency modulated signal, the frequency of said pulses of said pulse frequency modulated signal being proportional to said difference;
   fourth means for generating an output signal by routing either the pulse width modulated signal or the pulse frequency modulated signal to the output.

2. The controller of claim 1, wherein there are two portions of the output, one to increase the output and one to decrease the output and said fourth means routes the output signal to either the increasing portion or the decreasing portion.

3. The controller of claim 2, wherein said fourth means routes said output signal based on the polarity of said difference.

4. The controller of claim 3, wherein said fourth means includes fifth means for routing said output signal to cause said output signal to be direct acting on the output.

5. The controller of claim 3, wherein said fourth means includes fifth means for routing said output signal to cause said output signal to be reverse acting on the output.

6. The controller of claim 2, wherein said fourth means routes said output signal based on the relationship between said difference and the first derivative of said difference.

7. The controller of claim 1, wherein said second means includes a gain adjustment, said pulse width of said pulse width modulated signal is proportional to said gain.

8. The controller of claim 7, wherein said pulse frequency of said pulse frequency modulated signal is proportional to said gain.

9. The controller of claim 1, wherein said fourth means routes said pulse frequency modulated signal to the output when said pulse width of said pulse width modulated signal reaches a preset minimum value.

10. The controller of claim 9, wherein said minimum value is approximately fifteen milliseconds.

11. The controller of claim 9, wherein said fourth means routes said pulse width modulated signal when said pulse width of said pulse width modulated signal exceeds said preset minimum value.

12. The controller of claim 1, wherein said pulse width modulated signal has a fixed frequency.

13. The controller of claim 12, wherein said fixed frequency is approximately ten hertz.

14. The controller of claim 1, wherein said pulse frequency modulated signal has a fixed pulse width.

15. The controller of claim 14, wherein said fixed pulse width is between ten and fifteen milliseconds in length.

16. A signal generator for a proportional and integral controller controlling a variable represented by a signal representing the variable to a desired value, comprising:
  first means for calculating the difference between the desired value and the variable signal;
  second means for generating a pulse width modulated signal, the width of each of said pulses of said pulse width modulated signal being proportional to said calculated difference, said pulse width modulated signal being a proportional and integral component of the controller;
  third means for generating a pulse frequency modulated signal, the frequency of said pulses of said pulse frequency modulated signal being proportional to said calculated difference, said pulse frequency modulated signal being an integral component of the controller.

17. The controller of claim 16, wherein said second means includes gain adjustment, said pulse width of said pulse width modulated signal being proportional to said gain.

18. The controller of claim 17, wherein said pulse frequency of said pulse frequency modulated signal is proportional to said gain.

19. The controller of claim 16, wherein said pulse width modulated signal has a fixed frequency.

20. The controller of claim 19, wherein said fixed frequency is approximately ten hertz.

21. The controller of claim 16, wherein said pulse frequency modulated signal has a fixed pulse width.

22. The controller of claim 21, wherein said fixed pulse width is between ten and fifteen milliseconds in length.

23. A routing circuit for a represented proportional and integral and derivative controller controlling a variable by a signal representing the variable to a desired value through an output having a positive and negative direction, comprising:
  first means for calculating the difference between the desired value and the signal representing the variable;
  second means for differentiating said calculated difference;
  third means for calculating the routing difference between said differential and said calculated difference;
  fourth means calculating a proportional and integral signal based on said calculated difference;
  fifth means for setting said proportional and integral signal either to the positive or negative direction of the output based on the polarity of said routing difference,
  whereby derivative control is achieved with the proportional and integral control.

24. The routing circuit of claim 23, wherein said second means includes filter means for filtering said calculated difference to remove high frequency components of said calculated difference.

25. The routing circuit of claim 23, wherein said fifth means includes a switch, said switch including a first position for setting said proportional and integral signal to either the positive or negative directions of the output based on the polarity of said routing difference and including a second position for setting said proportional and integral signal to either the positive or negative direction of the output based on the polarity of said calculated difference.

* * * * *